United States Patent
Nakako et al.

(10) Patent No.: US 10,603,733 B2
(45) Date of Patent: Mar. 31, 2020

(54) METHOD FOR PRODUCING TIG WELDED STAINLESS STEEL TUBE, TIG WELDED STAINLESS STEEL TUBE, AND TIG WELDED STAINLESS MEMBER

(71) Applicant: Nisshin Steel Co., Ltd., Tokyo (JP)

(72) Inventors: Takefumi Nakako, Tokyo (JP); Tomokazu Nobutoki, Tokyo (JP); Hiroshi Asada, Tokyo (JP)

(73) Assignee: Nippon Steel Nisshin Co., Ltd., Tokyo (JP)

( * ) Notice: Subject to any disclaimer, the term of this patent is extended or adjusted under 35 U.S.C. 154(b) by 0 days.

(21) Appl. No.: 16/306,080

(22) PCT Filed: Jun. 2, 2017

(86) PCT No.: PCT/JP2017/020619
§ 371 (c)(1),
(2) Date: Nov. 30, 2018

(87) PCT Pub. No.: WO2017/209282
PCT Pub. Date: Dec. 7, 2017

(65) Prior Publication Data
US 2019/0134731 A1    May 9, 2019

(30) Foreign Application Priority Data

Jun. 3, 2016   (JP) ................................ 2016-111413
Jun. 1, 2017   (JP) ................................ 2017-108923

(51) Int. Cl.
*B23K 9/025*   (2006.01)
*B23K 9/167*   (2006.01)
(Continued)

(52) U.S. Cl.
CPC ................ *B23K 9/025* (2013.01); *B23K 9/09* (2013.01); *B23K 9/095* (2013.01); *B23K 9/167* (2013.01);
(Continued)

(58) Field of Classification Search
CPC .......... B23K 9/025; B23K 9/095; B23K 9/23; B23K 9/167; B23K 2100/06
(Continued)

(56) References Cited

U.S. PATENT DOCUMENTS

2001/0030004 A1   10/2001   Kushida et al.
2004/0188391 A1*   9/2004   Kimura ................ B23K 35/383
                                                            219/75
(Continued)

FOREIGN PATENT DOCUMENTS

CN   101508053 A   8/2009
CN   102211243 A   10/2011
(Continued)

OTHER PUBLICATIONS

International Search Report dated Jul. 4, 2017 in corresponding International Application No. PCT/JP2017/020619.
(Continued)

*Primary Examiner* — Thien S Tran
(74) *Attorney, Agent, or Firm* — Mintz Levin Cohn Ferris Glovsky and Popeo, P.C.; David G. Conlin; Joohee Lee

(57) ABSTRACT

The present invention provides a method for producing a TIG-welded stainless steel tube without adding $H_2$ to a shielding gas, while inhibiting generation of a weld defect. The method is a method for producing a TIG-welded stainless steel tube and includes the steps of bending a stainless steel strip in a width direction so as to butt both edges against each other and TIG-welding the both edges thus butted. A pulse waveform of a pulse frequency of 40 Hz to 300 Hz is used as a current waveform of a welding power source.

9 Claims, 6 Drawing Sheets

(51) Int. Cl.
    *C22C 38/44*     (2006.01)
    *C22C 38/40*     (2006.01)
    *C22C 38/00*     (2006.01)
    *C22C 38/48*     (2006.01)
    *B23K 9/09*     (2006.01)
    *C22C 38/04*     (2006.01)
    *C22C 38/02*     (2006.01)
    *B23K 9/095*     (2006.01)
    *B23K 9/23*     (2006.01)
    *B23K 103/04*     (2006.01)
    *B23K 101/06*     (2006.01)

(52) U.S. Cl.
    CPC .............. *B23K 9/23* (2013.01); *C22C 38/001* (2013.01); *C22C 38/004* (2013.01); *C22C 38/02* (2013.01); *C22C 38/04* (2013.01); *C22C 38/40* (2013.01); *C22C 38/44* (2013.01); *C22C 38/48* (2013.01); *B23K 2101/06* (2018.08); *B23K 2103/04* (2018.08)

(58) Field of Classification Search
    USPC ............................... 219/61.2, 74, 75, 137 PS
    See application file for complete search history.

(56) References Cited

U.S. PATENT DOCUMENTS

| | | | | |
|---|---|---|---|---|
| 2004/0234715 | A1* | 11/2004 | Gandy | B21C 37/08 428/36.9 |
| 2010/0224595 | A1* | 9/2010 | Choi | B23K 9/167 219/59.1 |
| 2011/0250472 | A1 | 10/2011 | Kamijo et al. | |
| 2015/0129559 | A1 | 5/2015 | Fairchild et al. | |
| 2018/0169799 | A1 | 6/2018 | Fairchild et al. | |

FOREIGN PATENT DOCUMENTS

| | | | |
|---|---|---|---|
| CN | 102560065 | A | 7/2012 |
| CN | 102935543 | A | 2/2013 |
| CN | 104508165 | A | 4/2015 |
| JP | 55-156670 | A | 12/1980 |
| JP | 57-126954 | | 8/1982 |
| JP | 61-095781 | | 5/1986 |
| JP | 03-027875 | | 2/1991 |
| JP | 04-220114 | | 8/1992 |
| JP | 2001-115238 | A | 4/2001 |
| JP | 2001115238 | A * | 4/2001 |
| JP | 2002-283056 | A | 10/2002 |
| JP | 2007-098459 | A | 4/2007 |
| KR | 10-2005-0026234 | A | 3/2005 |
| KR | 10-2012-0075296 | A | 7/2012 |
| KR | 20120075195 | A * | 7/2012 |

OTHER PUBLICATIONS

Office Action dated Mar. 6, 2018 in corresponding Japanese Patent Application No. 2017-108923.
English translation of International Search Report dated Jul. 4, 2017 in corresponding International Application No. PCT/JP2017/020619.
Office Action for Korean Patent Application No. 10-2018-7036731, dated Mar. 20, 2019, English translation, 14 pages.
Office Action for Chinese Patent Application No. 201780033978.X, dated Aug. 5, 2019, 15 pages.
Lei, Z., "Study on Microstructure and properties of welded joint of Ultra pure ferritic stainless steel with Sn", China Masters' Theses Full-text Database (Feb. 2015). with English translation, 12 pages.
Zengda, Z., "Welding material, Technique and Equipment Manual", Chemical Industry Press, p. 866 (Aug. 2001) with English translation, 6 pages.

* cited by examiner

FIG. 5
PLANE VIEW OF BEAD
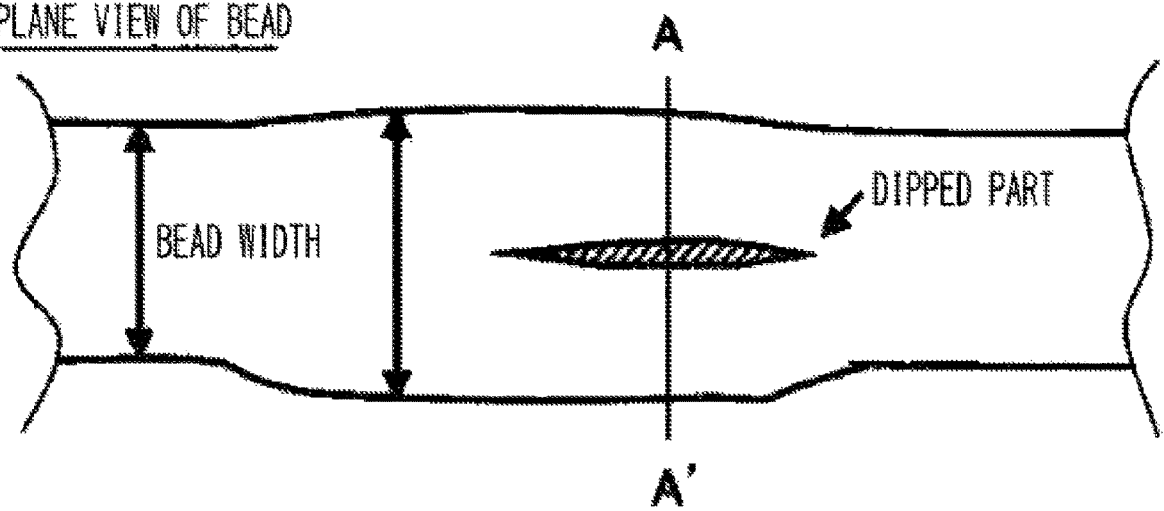
A-A' CROSS-SECTIONAL VIEW
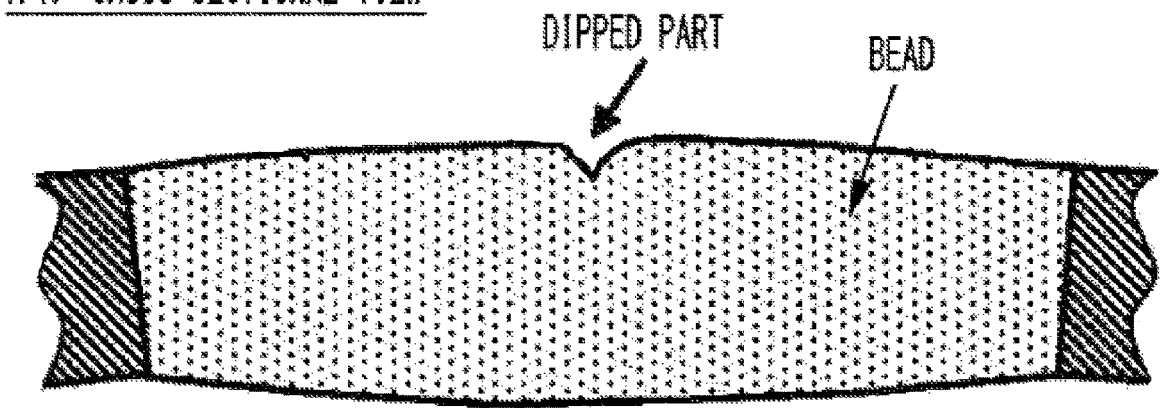

METHOD FOR PRODUCING TIG WELDED STAINLESS STEEL TUBE, TIG WELDED STAINLESS STEEL TUBE, AND TIG WELDED STAINLESS MEMBER

CROSS REFERENCE TO RELATED APPLICATION

The present application is a National Stage Entry of the International Patent Application No. PCT/JP2017/020619 filed Jun. 2, 2017, which also claims the benefit of priority of the Japanese Patent Application No. 2016-111413 filed Jun. 3, 2016 and Japanese Patent Application No. 2017-108923 filed Jun. 1, 2017. The entire contents of those applications are incorporated herein for all purposes by this reference.

TECHNICAL FIELD

The present invention relates to (i) a method for producing a welded stainless steel tube by bending a stainless steel strip so as to butt both edges against each other and TIG-welding the both edges thus butted, (ii) a TIG-welded stainless steel tube, and (iii) a TIG-welded stainless steel member that includes the TIG-welded stainless steel tube.

BACKGROUND ART

Welded stainless steel tubes are produced by various kinds of welding methods such as high frequency resistance welding, laser welding, TIG welding, and plasma welding. Among those, the TIG welding is a welding method which is most widely used because a cost of equipment is inexpensive and excellent welding quality can be achieved.

In a case where a welded tube is produced by TIG welding, arc discharge is generated between an end of a tungsten electrode and a welding target material, and the welding target material is welded by heat of the arc discharge. Here, stability of the arc discharge is one of factors that influence the welding quality. The arc discharge is an electromagnetic phenomenon, and therefore the welding target material is demanded to be physically stable in order to maintain stable arc discharge that is emitted from the end of the tungsten electrode toward the welding target material which is an electric conductor.

CITATION LIST

Patent Literature

Patent Literature 1: Japanese Patent Application Publication, Tokukai, No. 2007-098459 (Publication Date: Apr. 19, 2007)

SUMMARY OF INVENTION

Technical Problem

However, in a roll forming method which is used to bend a steel strip in a width direction in producing a welded tube, a butted part is shaken due to influence of friction that is caused by a difference in circumferential speeds of rollers, meandering of the material in the width direction and/or a circumferential direction, and the like, and this causes a phenomenon in which an arc moves back and forth in welding.

In a case where a gap in the butted part varies so as to open and close, a contact point between both edges of the steel strip is to be shaken in a traveling direction along a tube production line, and an arc also moves back and forth in the line traveling direction (see FIG. 4). In a case where the arc moves toward an exit side in the traveling direction, a relative velocity of the arc with respect to the welding target material becomes lower and accordingly a heat input becomes excessively high. Meanwhile, in a case where the arc returns to its original position (i.e., moves opposite to the traveling direction), the relative velocity of the arc with respect to the welding target material becomes higher and accordingly a heat input becomes insufficient.

In a case where the heat input becomes excessively high due to such a phenomenon, a bead width is partially widened and therefore solidification is delayed. From this, impurities such as phosphorus and sulfur having low melting points are accumulated in a finally solidified part, and a dipped part is more likely to be generated at the center of a welded part. Such a minute dipped part caused due to variation in bead width is a general phenomenon that is often found. However, in cases where high welding quality is demanded in view of purpose of use of a welded tube, a welded tube after welding is to be used as it is without polishing a bead, and the like, even a slight disturbance in shape of bead and a small dipped part may be considered as problems, i.e., weld defects.

As a method for preventing such a minute weld defect, a technique to inhibit the arc from moving back and forth may be employed. As a specific method, there is a method in which $H_2$ is added to argon which is a shielding gas so that an arc is constricted by a thermal pinch effect by $H_2$, and thus a directivity of the arc is heightened. However, such a method cannot completely prevent the arc from moving back and forth, and the effect of such a method is merely limitative. Moreover, for a material that is susceptible to hydrogen embrittlement, $H_2$ cannot be added to the shielding gas.

For example, Patent Literature 1 discloses a method that can inhibit generation of a defect in a welded metal part when high-speed gas shielded welding is carried out with respect to a zinc-based coated steel plate. Specifically, a technique is disclosed in which a magnetic coil is attached to an end of a welding torch, and arc welding is carried out while a molten pool is stirred by applying an alternating magnetic field to a surface of a welding target material. From this, escape of zinc vapor from the molten pool is facilitated, and thus a defect caused due to zinc vapor is reduced.

However, the method disclosed in Patent Literature 1 is a technique to inhibit a defect from being caused in the welded metal part when the zinc-based coated steel plate is high-speed welded by pulsed metal active gas (MAG) welding. Moreover, a special welding device that is provided with a magnetic coil is required. Therefore, such a technique cannot be simply applied to production of a stainless steel tube by tungsten inert gas (TIG) welding.

An aspect of the present invention is accomplished in view of the conventional problems, and its object is to provide a method for producing a TIG-welded stainless steel tube without adding $H_2$ to a shielding gas, while inhibiting generation of a weld defect.

Solution to Problem

In order to attain the object, a method in accordance with an aspect of the present invention for producing a TIG-welded stainless steel tube includes the steps of: bending a stainless steel strip in a width direction so as to butt both edges against each other; and TIG-welding the both edges thus butted, a pulse waveform of a pulse frequency of 40 Hz to 300 Hz being used as a current waveform of a welding power source.

In order to attain the object, a TIG-welded stainless steel tube in accordance with an aspect of the present invention includes: a TIG-welded part that is formed by bending a stainless steel strip in a width direction and TIG-welding both edges of the stainless steel strip, a composition of the stainless steel strip containing 11% by weight to 35% by weight of Cr, and the number of weld defects in a weld bead that is formed in the TIG-welded part is 0.5 or less per 1 m of the TIG-welded part.

Advantageous Effects of Invention

By using the method for producing the TIG-welded stainless steel tube in accordance with an aspect of the present invention, it is possible to bring about an effect of preventing a weld defect even when only an Ar gas is used with respect to a raw material for which $H_2$ cannot be added to a shielding gas, and it is possible to produce the TIG-welded stainless steel tube that excels in welding quality.

BRIEF DESCRIPTION OF DRAWINGS

FIG. 5 is a schematic view for explaining a state in which a weld bead width varies and a dipped part that is generated in a middle part of a weld bead and a cross-sectional shape of the dipped part.

DESCRIPTION OF EMBODIMENTS

Figure 1:
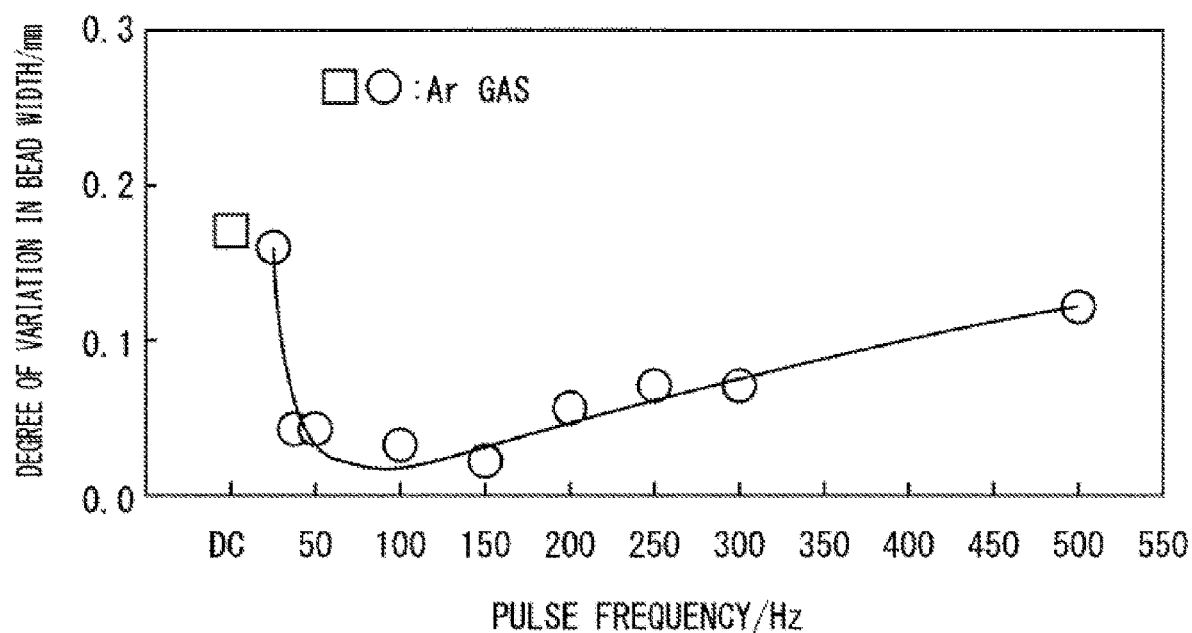
FIG. 1 is an explanatory view showing a relation between a welding condition in TIG welding and a degree of variation in weld bead width in a welded steel tube that has been produced by using a steel material C shown in Table 1 as a raw material.

The following description will discuss embodiments of the present invention. Note that the following descriptions are aimed merely at better understanding of the gist of the invention, and do not limit the present invention unless otherwise specified. Moreover, in this specification, "A to B" means "A or more (higher) and B or less (lower)".

In the following descriptions, findings of the present invention will be schematically explained, in advance of the descriptions of the method for producing a TIG-welded stainless steel tube in accordance with embodiments of the present invention.

Schematic Explanation of Findings of Invention

In a tube production line for producing a stainless steel tube by bending a stainless steel strip so as to butt both edges against each other and TIG-welding (electric resistance welding) the both edges thus butted, a small dipped part may be generated in a finally solidified part (weld bead) in an electric-resistance-welded part. In a case where a depth of the dipped part is deep to an extent that is approximately 10% or higher of a thickness of a stainless steel strip, a stainless steel tube having such a dipped part cannot be used depending on purpose of use of the stainless steel tube. For example, in a case of being used in a heat exchanger, a crack due to thermal fatigue may easily occur in the stainless steel tube having the dipped part.

In order to explain an example of the dipped part, FIG. 5 illustrates a state of a weld bead which has been obtained by bending a stainless steel strip so as to butt both edges against each other and TIG-welding the both edges thus butted.

FIG. 5 is a schematic view for explaining a state in which a weld bead width varies and a dipped part that is generated in a middle part of a weld bead and a cross-sectional shape of the dipped part. As illustrated in FIG. 5, the dipped part is generated at the center of a part having a locally-widened bead width.

Here, in general, a mixed gas in which $H_2$ is added to argon may be used as a shielding gas for TIG welding. $H_2$ is an activated gas and causes a thermal pinch effect. Therefore, in a case where an (Ar+$H_2$) mixed gas is used as a shielding gas, an arc is constricted, and it may therefore be possible to heighten a directivity of the arc and to inhibit the arc from moving back and forth.

However, the TIG welding method in which the (Ar+$H_2$) mixed gas is used has the following problems. That is, the method has disadvantages as follows: (i) the method cannot be applied to a material that is susceptible to hydrogen embrittlement, (ii) the method may require a dehydrogenation process such as annealing after welding and equipment for carrying out such a process, and (iii) quality management may become difficult because a concentration of $H_2$ is one of parameters of welding conditions.

In view of the problems, the inventors of the present invention diligently studied a TIG welding method that can inhibit generation of a weld defect even in a case where an inert gas to which $H_2$ has not been added is used as a shielding gas, and have conceived the followings. That is, the inventors of the present invention thought that, by stirring a molten pool during solidification, it might be possible to inhibit variation in weld bead width in a part in which a heat input is excessively high and to prevent accumulation of impurities having low melting points in a finally solidified part even if the heat input varies due to moving back and forth of an arc. Then, the inventors of the present invention studied in detail a method for realizing this conception.

As a result, the inventors of the present invention have found that an effect below can be brought about by (i) setting a current waveform of TIG welding to be a pulse waveform and (ii) setting a frequency of the pulse waveform to be a relatively low value (specifically, a later described frequency range) that is obtained by a formula (1) based on a thickness of a welding target material. That is, the inventors of the present invention have found the followings: it is possible to inhibit accumulation of impurities having low melting points in a finally solidified part by stirring a molten pool during solidification in a part in which a heat input is excessively high, even if the heat input varies due to moving back and forth of the arc; and it is therefore possible to prevent a dipped part (i.e., generation of a weld defect) in a middle part of a bead.

$$f=(50/(t^{0.5}))\cdot C \qquad (1)$$

where
f: pulse frequency (Hz),
t: thickness of steel strip (mm),
C: coefficient (0.8 to 1.4).

Then, as a result of further studies based on the formula (1), it has been found that it is possible to inhibit variation in weld bead width and to prevent generation of a weld defect by setting a pulse frequency f to 40 Hz to 300 Hz.

An aspect of the present invention is based on the above findings. That is, in the method in accordance with the present embodiment for producing a TIG-welded stainless steel tube, a pulse waveform of a pulse frequency of 40 Hz to 300 Hz is used as a current waveform of a welding power source in bending a stainless steel strip in a width direction so as to butt both edges against each other and TIG-welding the both edges thus butted. From this, it is possible to produce the TIG-welded stainless steel tube that excels in welding quality.

A mechanism that can bring about the above effect by employing such a pulse frequency range may be, for example, a mechanism as follows. That is, in a case where a welding current is high (i.e., a peak current of a pulse), force for pushing a surface of a molten pool downward works by arc force and, in a case where the welding current is low (i.e., a base current of the pulse), the arc force is reduced and force for lifting the molten pool upward works by surface tension of the molten pool. Those forces alternately work and vibrate the molten pool.

Here, in a case where the pulse frequency is lower than 40 Hz, each of a period of pushing down and a period of lifting up becomes excessively long, and this causes unstable vibration of the molten pool. In a case where the pulse frequency is higher than 300 Hz, each of the period of pushing down and the period of lifting up becomes excessively short, and therefore the molten pool cannot be sufficiently vibrated.

In a case where the pulse frequency is approximately 100 Hz, the effect is most greatly achieved. This may be because a pulse frequency that is closer to a natural frequency (that is said to be several tens of hertz) of the molten pool would cause a greater effect of vibrating and stirring the molten pool.

Method for Producing TIG-Welded Stainless Steel Tube

The following description will discuss a method for producing a TIG-welded stainless steel tube in accordance with an embodiment of the present invention.

(Welding Condition)

In the method for producing the TIG-welded stainless steel tube in accordance with the present embodiment, a stainless steel strip is bent in a width direction so that both edges are butted against each other, and a weld bead is formed by transferring the steel strip while generating an arc between a tungsten electrode and a butted part. As a basic device and the like which are used in such TIG welding, it is possible to employ a generally used device and the like. Therefore, for the purpose of simplification of descriptions, such a device and the like are not described with reference to the drawings.

A method of the bending is not limited to a particular one, and it is preferable to employ a general roll forming method. The production method can be suitably used in a case where, for example, a butted part is shaken due to influence of friction that is caused by a difference in circumferential speeds of rollers, meandering of the material in the width direction and/or a circumferential direction, and the like.

According to the method for producing the TIG-welded stainless steel tube in accordance with the present embodiment, a pulse waveform of a pulse frequency of 40 Hz to 300 Hz is used as a current waveform of a welding power source, and pulsed TIG welding is carried out by applying a direct pulsed current while setting an electrode side as a negative electrode. The pulse waveform is not limited to a particular one.

A pulse width (i.e., a ratio of a peak current period to one pulse period) does not influence the effect so much, and is preferably selected from a range from 30% to 70%.

Values of a peak current and a base current for generating a pulsed arc only need to be electric current values with which a pulsed arc can be generated, and can be set as appropriate depending on a composition, a plate thickness, and the like of a stainless steel material. Moreover, a welding speed can also be set as appropriate depending on a composition, a plate thickness, and the like of the stainless steel material. This is because the electric current value and the welding speed closely relate to an amount of heat input with respect to a welding target part.

For example, in a case where a plate thickness of a stainless steel material is approximately 0.3 mm to 1.2 mm, it is suitable to employ the following conditions: that is, welding speed: 2 m/min to 5 m/min; base current: 10 A to 20 A; peak current: 210 A to 230 A; average current: approximately 120 A (specifically, for example, 118 A to 125 A).

A width of a weld bead can be determined depending on various welding conditions, and is not limited in particular. Normally, a width of a weld bead can be approximately five times greater than a plate thickness of a stainless steel material.

In general, a filler metal (welding wire) may be added to a molten pool in TIG welding depending on a purpose. However, in the TIG welding method in accordance with the present embodiment, no filler metal is used. Note, however, that pulsed TIG welding can be carried out with use of a filler metal.

The tungsten electrode can be configured with a material and a shape (electrode diameter, tip shape) which are generally employed in direct current TIG welding.

In the TIG welding method in accordance with the present embodiment, weaving operation is not carried out. Note, however, that it is possible to carry out weaving operation.

As a back shielding gas, an argon gas can be used or a gas having a composition similar to that of the shielding gas (described later) can be used.

(Shielding Gas)

In the TIG welding method in accordance with the present embodiment, an inert gas to which $H_2$ has not been added is used as a shielding gas. The shielding gas can be an argon (Ar) gas, a helium gas, or a mixed gas of those gases. Preferably, the shielding gas is a gas containing Ar and inevitable impurities.

(Base Steel Strip)

A base steel strip that serves as a base material for producing the TIG-welded stainless steel tube can be selected as appropriate from among conventionally used stainless steel strips in accordance with a purpose of use of the TIG-welded stainless steel tube. The stainless steel is not limited to a particular kind.

Here, in general, even in a case where $H_2$ is contained in the shielding gas, austenite-based stainless steel is less likely to be influenced by $H_2$. On the other hand, other kinds of stainless steel may be influenced by hydrogen embrittlement if the shielding gas contains $H_2$.

Under the circumstances, it is not necessary to add $H_2$ to the shielding gas in the production method in accordance with the present embodiment, and therefore the production method in accordance with the present embodiment can be suitably used with respect to ferrite-based stainless steel. Ferrite-based stainless steel having a smaller nickel content is less expensive than austenite-based stainless steel, and is therefore proactively used in the market.

Among various kinds of ferrite-based stainless steel, high chromium ferrite-based stainless steel having a relatively large Cr content has a relatively high melting point, and therefore a hot crack (weld defect) is more likely to occur due to a shrinkage cavity formed in solidification of molten metal. The production method in accordance with the present embodiment can be suitably applied to such high chromium ferrite-based stainless steel. This is because, in the production method in accordance with the present embodiment, the molten pool is appropriately stirred, and this makes it possible to delay generation of a shrinkage cavity formed by solidification, and thus solidify the molten metal such that no weld defect occurs.

It is preferable that a composition of the stainless steel strip contains Cr in an amount of 11% by weight or more and 35% by weight or less. In a case where the Cr content is less than 11% by weight, a performance as stainless steel cannot be obtained and therefore such a Cr content is inappropriate. In a case where the Cr content is more than 35% by weight, a problem occurs as follows: that is, a melting point of the stainless steel strip becomes excessively high, a welded part becomes hard, and toughness is more likely to become considerably low. Therefore, such a Cr content is not preferable.

In a case where the base steel strip is a ferrite-based stainless steel strip, a composition of the ferrite-based stainless steel strip preferably contains Si, Mn, and Ni components as indicated in the following composition in order to secure corrosion resistance and toughness of the welded part.

In a case where an amount of Si is less than 0.01% by weight, Si can hardly bring about its effect. In a case where an added amount of Si is more than 1.0% by weight, weldability and toughness of the welded part are lowered. Therefore, the amount of Si is 0.01% by weight to 1.0% by weight, preferably 0.05% by weight to 0.25% by weight.

In a case where an amount of Mn is less than 0.01% by weight, Mn can hardly bring about its effect. In a case where Mn is excessively added, weldability is impaired (i.e., the welded part is hardened and toughness is deteriorated). Therefore, the amount of Mn is 0.01% by weight to 0.6% by weight, preferably 0.10% by weight to 0.40% by weight.

Ni can improve toughness of the base material while enhancing strength of the base material. In a case where an amount of Ni is less than 0.01% by weight, Ni can hardly bring about its effect. In a case where Ni is more than 0.6% by weight, the welded part is hardened and toughness is more likely to be deteriorated. Therefore, the amount of Ni is 0.01% by weight to 0.6% by weight, preferably 0.10% by weight to 0.40% by weight.

In a case where an intended characteristic is to be further improved, the ferrite-based stainless steel strip can contain predetermined amounts of other elements such as C, N, S, P, Mo, and Nb as in, for example, the later described Examples.

A plate thickness of the base steel strip is not limited in particular and can be, for example, 0.1 mm to 1.2 mm, preferably 0.3 mm to 1.0 mm. As the plate thickness increases, the effect of pulse may be reduced. This may be because, as the plate thickness increases, heat capacity of a molten part becomes greater, and this reduces the stirring effect brought about by the pulse.

(Stainless Steel Tube)

A diameter of the stainless steel tube is not limited in particular and is, for example, 6.35 mm to 89.1 mm in view of a relation with the above described plate thickness of the base steel strip. Specifically, the diameter of the stainless steel tube can be, for example, 25.4 mm (i.e., 1 inch) or 12.7 mm.

(Degree of Variation of Weld Bead, Ratio of Variation, Number of Weld Defects)

According to the method for producing the TIG-welded stainless steel tube in accordance with the present embodiment, it is possible to inhibit variation in width of the weld bead, that is, reduce a degree of variation (ratio of variation) in weld bead width. Moreover, it is possible to reduce the number of weld defects that are formed in the weld bead. The following description will discuss how to evaluate the degree of variation of the weld bead, the ratio of variation, and the number of weld defects with reference to FIG. 6. Note that the weld bead width means a width in a direction perpendicular to a longitudinal direction (i.e., a transferred direction (welding direction) of a steel strip that is being welded) of a weld bead formed in TIG welding.

Figure 6:
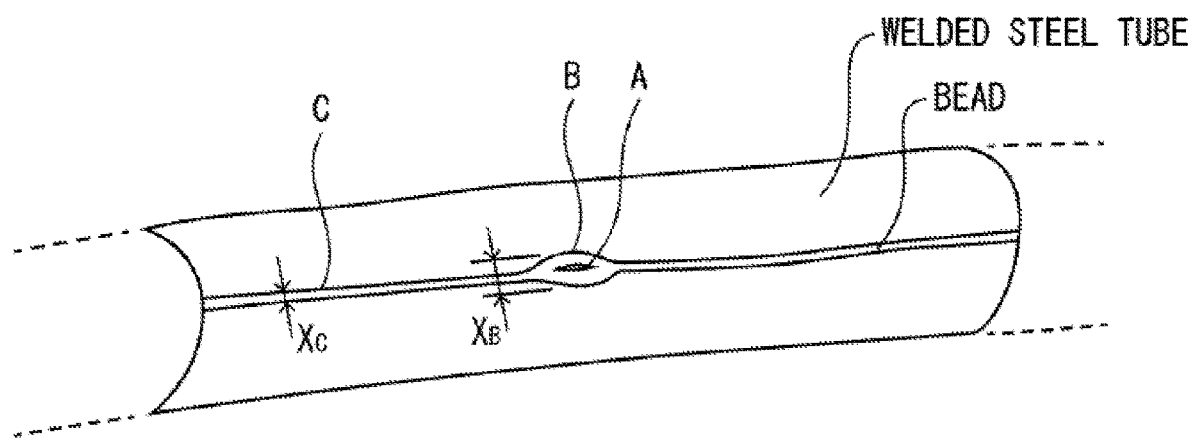
FIG. 6 is a schematic view for explaining a degree of variation in weld bead width, a ratio of variation, and a weld defect.

FIG. 6 is a schematic view for explaining a degree of variation in weld bead width, a ratio of variation, and a weld defect. The inventors of the present invention have found the followings: that is, according to the method for producing the TIG-welded stainless steel tube (hereinafter, sometimes referred to as "welded steel tube") in accordance with an aspect of the present invention, a weld defect (indicated by A in FIG. 6) always exists in a middle part in a width direction of a bead of the produced welded steel tube, and bead widths always become broader than a stable part (indicated by C in FIG. 6) in front of and behind (in the longitudinal direction of the welded steel tube) a part (indicated by B in FIG. 6) in which the weld defect exists. In view of this, the degree of variation in bead width, the ratio of variation, and the weld defect in the produced welded steel tube are evaluated as follows.

One evaluation target material having a length of 1 m is cut out for every 20 m of the produced welded steel tube. The numbers of cut-out materials are as follows: 100 in total in the later described Example 1; and 10 in total in each of the later described Example 2, Example 3, and Comparative Example. This means that, for example, 100 evaluation target materials are cut out from each of samples shown in Table 3 of the later described Example 1 and evaluated.

Then, from each of the evaluation target materials, a portion (indicated by B in FIG. 6, hereinafter sometimes referred to as "defect portion") in which the weld bead width is broader than the stable part is extracted first by visual checking. Here, the stable part means a part in which TIG welding has been normally carried out and which has a constant or substantially constant weld bead width. The state "substantially constant" means that a variation in weld bead width per predetermined length (e.g., 100 cm) falls within ±3%. Note that, although not illustrated, there may be a portion in which no dipped part is generated even when the weld bead width is broader than the stable part. In the following descriptions, such a portion will also be referred to as a defect portion for convenience of explanation.

Each of evaluation target materials from which a portion having a weld bead width greater than the stable part has been extracted is evaluated in terms of (1) below. On the other hand, in a case where a portion having a weld bead width greater than the stable part has been not extracted, that is, in a case where a bead width of a welded part is constant along a full length of one evaluation target material and thus the welded part along the full length is considered as a stable part, such an evaluation target material is not evaluated any more.

(1) Degree of Variation in Bead Width of Welded Steel Tube

In an evaluation target material having a length of 1 m, a bead width (i.e., a standard value indicated by $X_C$ in FIG. 6) of a stable part and a bead width (indicated by $X_B$ in FIG. 6) of a defect portion are measured with use of vernier calipers. Then, $X_C$ and $X_B$-$X_C$ are respectively recorded as a bead width of the evaluation target material and a degree of variation in bead width of a defect portion in the evaluation target material. Note that the bead width indicated by $X_B$ in FIG. 6 can also be said as a maximum bead width in a certain one defect portion. In this specification, $X_B$-$X_C$ is sometimes referred to as a variation value of a bead width in a certain one defect portion. The standard value can be obtained as follows: That is, the standard value can be obtained as an average value of weld bead widths of a weld bead (stable part) other than the defect portion in the evaluation target material having the length of 1 m. The average value is obtained, for example, as an average value of weld bead widths obtained by measuring dispersed five locations of a weld bead in the stable part of the evaluation target material having the length of 1 m.

Then, with use of the bead width (i.e., the standard value indicated by $X_C$ in FIG. 6) of the stable part and an absolute value of the variation value, a ratio of variation in bead width in a certain one defect portion is calculated. Note that the absolute value of the variation value is employed because a case is considered in which the variation value might be a negative value.

Specifically, the ratio of variation in bead width is calculated with use of the following formula:

Ratio of variation in bead width=$(|X_B-X_C|/X_C)$ (2) Determination of Weld Defect Next, at a part (indicated by B in FIG. 6) in which a weld defect may exist, the evaluation target material is cut along a plane that extends in a direction perpendicular to the longitudinal direction of the welded steel tube (see FIG. 5), and a cross section thus obtained is observed with an optical microscope and thus a depth of a dipped part (indicated by A in FIG. 6) is obtained. In a case where the depth of the dipped part is 10% or higher of a plate thickness of the evaluation target material, the dipped part is determined as a weld defect. Note that, in a case where two or more parts which had weld bead widths broader than that of the stable part are extracted from one evaluation target material, the above (1) and (2) are evaluated for each of those parts.

A degree of variation and a ratio of variation in bead width of a welded steel tube and a weld defect are determined for each of the 100 evaluation target materials or each of the 10 evaluation target materials, and then the number of parts which has been determined as weld defects in the above (2) is divided by a length of 2000 m (for the 100 evaluation target materials) or by a length of 200 m (for the 10 evaluation target materials). Thus, the number of weld defects (pieces/m) is obtained. Moreover, based on pieces of data which has been obtained from all defect portions detected from the 100 evaluation target materials or from the 10 evaluation target materials, an average of bead widths ($X_C$) of stable parts obtained in the above (1), an average of degrees of variation in bead width ($X_B$-$X_C$), and an average of ratios of variation in bead width are obtained.

(Welded Stainless Steel Tube, Welded Stainless Steel Member)

A welded steel tube that has been produced with use of the method for producing a TIG-welded stainless steel tube in accordance with the present embodiment has a TIG-welded part that has been obtained by bending a stainless steel strip in the width direction and TIG-welding both edges of the stainless steel strip. The TIG-welded part includes a weld bead, a defect portion, and a weld defect which are described above.

A TIG-welded stainless steel member including such a welded steel tube is also encompassed in the scope of the present invention. The TIG-welded stainless steel member can be, for example, a boiler, a heat exchanger, an apparatus for exhaust gas, a chemical plant pipe, or the like.

[Recap]

As above described, the method in accordance with an embodiment of the present invention for producing a TIG-welded stainless steel tube includes the steps of: bending a stainless steel strip in a width direction so as to butt both edges against each other; and TIG-welding the both edges thus butted, a pulse waveform of a pulse frequency of 40 Hz to 300 Hz being used as a current waveform of a welding power source.

In a case where an electric current is high (i.e., a peak current), force for pushing a surface of a molten pool downward works by arc force and, in a case where the electric current is low (i.e., a base current), the arc force is reduced and force for lifting the molten pool upward works by surface tension of the molten pool. Those forces alternately work and vibrate the molten pool.

In a case where the pulse frequency is lower than 40 Hz, each of a period of pushing down and a period of lifting up becomes long, and this causes unstable vibration of the molten pool. In a case where the pulse frequency is higher than 300 Hz, each of the period of pushing down and the period of lifting up becomes short, and therefore the molten pool cannot be sufficiently vibrated.

According to the method for producing the TIG-welded stainless steel tube in accordance with an embodiment of the present invention, it is preferable that a composition of the stainless steel strip contains 11% by weight to 35% by weight of Cr.

Further, according to the method for producing the TIG-welded stainless steel tube in accordance with an embodiment of the present invention, the number of weld defects in a weld bead that is formed on a surface of the welded stainless steel tube is 0.5 or less per 1 m of the welded stainless steel tube.

According to the method for producing the TIG-welded stainless steel tube in accordance with an embodiment of the present invention, it is preferable that a weld bead that is formed on a surface of the welded stainless steel tube has a ratio of variation of 5% or lower, the ratio of variation being represented by a formula (2) below:

$$(\text{Ratio of variation})=(|X_B-X_C|/X_C) \quad (2)$$

where $X_B$ is a width that is of the weld bead and is in a direction perpendicular to a welding direction, and $X_C$ is a standard value of the width.

The TIG-welded stainless steel tube in accordance with an embodiment of the present invention includes: a TIG-welded part that is formed by bending a stainless steel strip in a width direction and TIG-welding both edges of the stainless steel strip, a composition of the stainless steel strip containing 11% by weight to 35% by weight of Cr, and the number of weld defects in a weld bead that is formed in the TIG-welded part is 0.5 or less per 1 m of the TIG-welded part.

According to the TIG-welded stainless steel tube in accordance with an embodiment of the present invention, it is preferable that the weld bead has a ratio of variation of 5% or lower, the ratio of variation being represented by a formula (2) below:

$$\text{(Ratio of variation)} = (|X_B - X_C|/X_C) \quad (2)$$

where $X_B$ is a width that is of the weld bead and is in a direction perpendicular to a welding direction, and $X_C$ is a standard value of the width.

Moreover, a TIG-welded stainless steel member including such a TIG-welded stainless steel tube is also encompassed in a technical scope of the present invention.

EXAMPLES

The following description will discuss Examples of the method for producing the TIG-welded stainless steel tube in accordance with an aspect of the present invention. Note, however, that the present invention is not limited to those Examples.

Table 1 shows alloy compositions of steel strips of three types of high-purity ferrite-based steel (i.e., steel materials A through C) which were used in Example 1 and Example 2 described below. The bottom row of Table 1 shows a raw material (i.e., the steel material C) that was used in Example 1 and Example 2. The steel material C was high-purity ferrite-based stainless steel that had a thickness of 0.3 mm, contained approximately 28% by weight of Cr, and contained approximately 3.8% by weight of Mo. Each of the upper two rows of Table 1 shows a raw material that was used in Example 2. The raw material was high-purity ferrite-based stainless steel that had a thickness of 1.0 mm or 0.6 mm, contained approximately 28% by weight of Cr, and contained approximately 3.8% by weight of Mo.

TABLE 1

| Steel Material | t/mm | C | N | Si | Mn | S | P | Cr | Mo | Ni | Nb | Remarks |
|---|---|---|---|---|---|---|---|---|---|---|---|---|
| | | | | | | | | | | | | (mass %) |
| A | 1.0 | 0.004 | 0.014 | 0.10 | 0.34 | 0.001 | 0.027 | 28.35 | 3.68 | 0.34 | 0.30 | Example 2 |
| B | 0.6 | 0.004 | 0.015 | 0.06 | 0.35 | 0.003 | 0.027 | 28.18 | 3.67 | 0.34 | 0.30 | Example 2 |
| C | 0.3 | 0.007 | 0.015 | 0.11 | 0.36 | 0.001 | 0.026 | 28.31 | 3.65 | 0.35 | 0.29 | Examples 1, 2 |

Table 2 shows alloy compositions of steel strips of four types of high-purity ferrite-based steel (i.e., steel materials D through G) which were used in Example 3 described below, and an alloy composition of one type of high-purity ferrite-based steel (i.e., a steel material H) which was used in Comparative Example. The steel material D was high-purity ferrite-based stainless steel (SUS444) that contained approximately 17% by weight of Cr and approximately 2% by weight of Mo. The steel material E was high-purity ferrite-based stainless steel (SUS445J1) that contained approximately 22% by weight of Cr, approximately 1% by weight of Mo, and Nb. The steel material F was high-purity ferrite-based stainless steel (SUS447J1) that contained approximately 30% by weight of Cr and approximately 2% by weight of Mo. The steel material G was low-C high-purity ferrite-based stainless steel (SUS410L) that contained approximately 14% by weight of Cr. The steel material H in the bottom row in Table 2 was high-purity ferrite-based heat resisting steel (SUH409) that contained approximately 11% by weight of Cr. Specifically, a Cr content in the steel material H was lower than 11%.

Note that the sign "-" in Table 2 indicates that a content of each component was not analyzed and therefore no value was obtained.

TABLE 2

| Steel Material | C | N | Si | Mn | S | P | Cr | Mo | Ni | Nb |
|---|---|---|---|---|---|---|---|---|---|---|
| | | | | | | | | | | (mass %) |
| D | 0.007 | 0.010 | 0.25 | 0.15 | 0.001 | 0.033 | 18.33 | 1.86 | 0.18 | 0.44 |
| E | 0.004 | 0.010 | 0.16 | 0.15 | 0.001 | 0.030 | 22.14 | 1.16 | 0.12 | 0.21 |
| F | 0.007 | 0.01 | 0.20 | 0.20 | 0.001 | 0.031 | 30.20 | 2.08 | 0.18 | 0.17 |
| G | 0.003 | 0.01 | 0.22 | 0.22 | 0.001 | 0.025 | 14.10 | — | 0.10 | — |
| H | 0.010 | — | 0.25 | 0.26 | 0.001 | 0.022 | 10.72 | — | 0.15 | — |

Example 1

The high-purity ferrite-based stainless steel (i.e., the steel material C) shown in the bottom row in Table 1 was shaped into a roll, and then TIG welding was carried out while using Ar as a shielding gas. Thus, a welded steel tube having a diameter of ϕ12.7 mm was produced, and a relation between welding conditions of TIG welding and the number of weld defects was analyzed.

Figure 3:
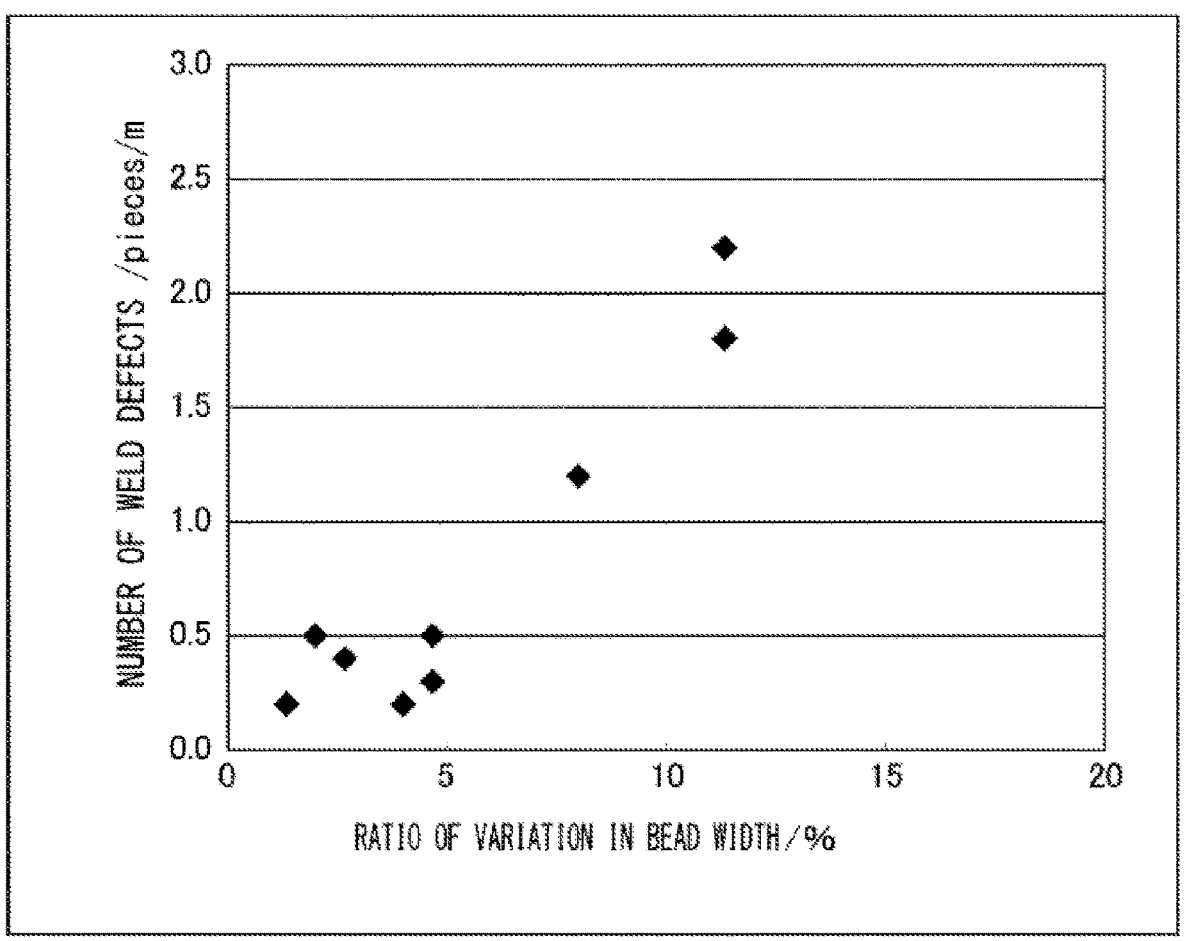
FIG. 3 is a graph showing a relation between a ratio of variation in weld bead width and the number of weld defects.
Figure 4:
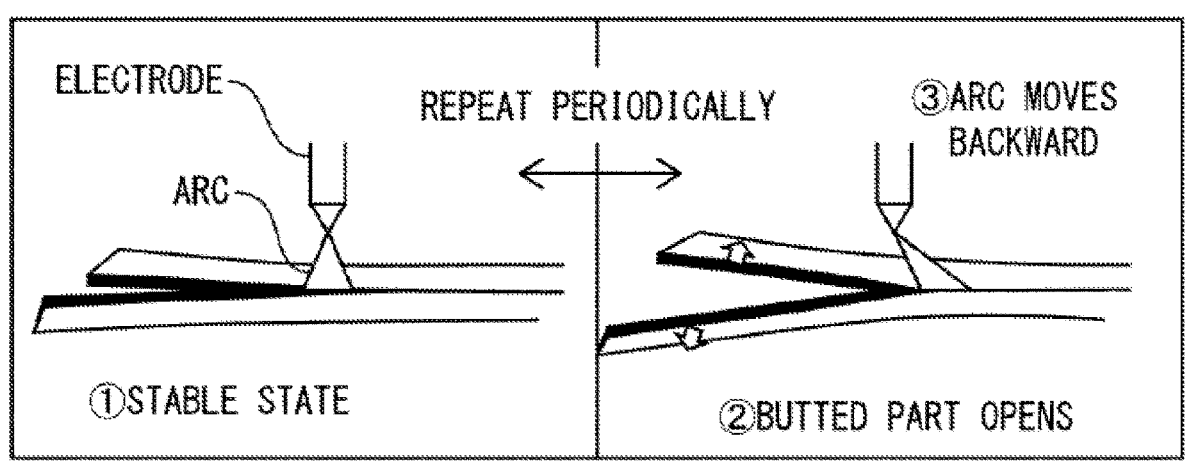
FIG. 4 is a schematic view for explaining a state in which an arc moves back and forth due to opening and closing of a gap in a butted part.

As above described, a weld bead width was measured, and a degree of variation and a ratio of variation were calculated. As weld defects, dipped parts were counted each of which had a depth that was 10% or higher of a raw material thickness among dipped parts generated in a middle part of a bead as illustrated in FIG. 4. Results are shown in Table 3 and FIGS. 1 through 3. Note that, in Table 3, an up arrow in a box indicates that a numerical value of the box is identical with that in the above box. The same applies to the other Tables shown below in this specification.

91 Hz that is considered as an optimum condition and is obtained with a coefficient C=1.0 in the formula (1). Moreover, an effect was hardly seen in pulsed welding carried out with a frequency of 5,000 Hz which was far greater than an upper limit of the formula (1).

$$f=(50/(t^{\wedge}0.5))^{\wedge}C \qquad (1)$$

where f: pulse frequency (Hz),
t: thickness of steel strip (mm),
C: coefficient (0.8 to 1.4).

Figure 2:
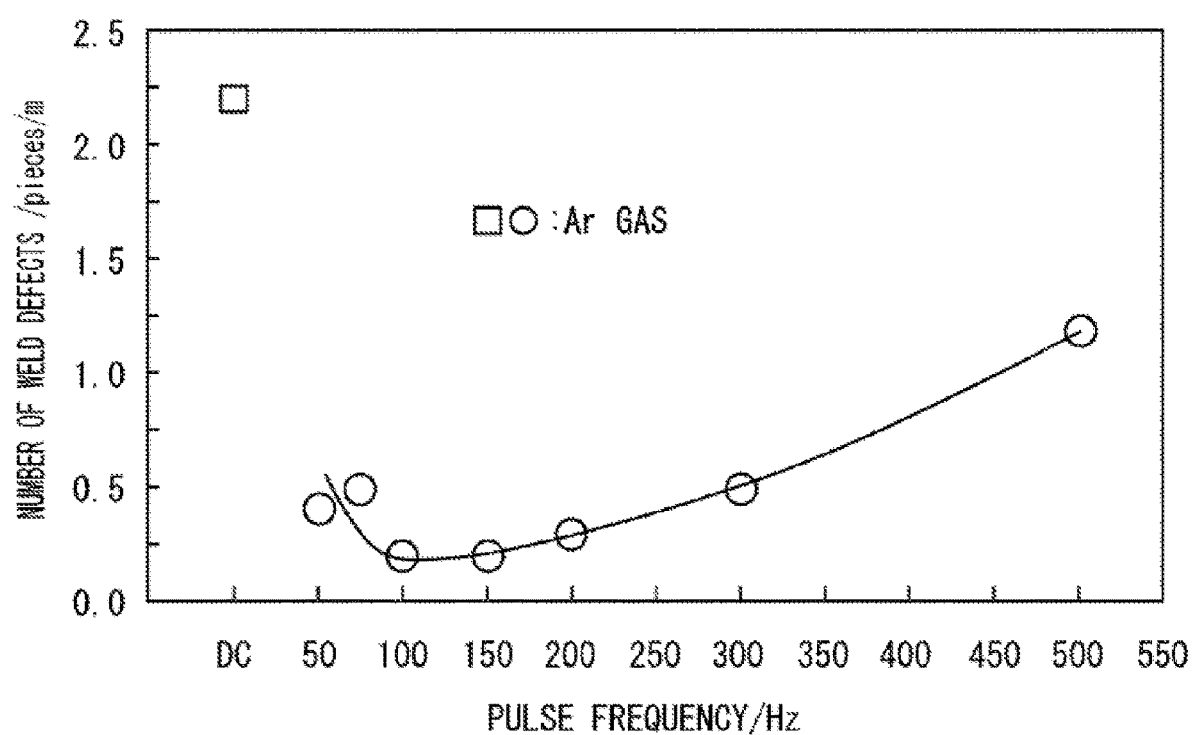
FIG. 2 is an explanatory view showing a relation between a welding condition in TIG welding and the number of weld defects in a welded steel tube that has been produced by using a steel material C shown in Table 1 as a raw material.

Here, the results shown in Table 3 are organized into graphs as below. FIG. 1 is a graph showing influence of a pulse frequency on a degree of variation in bead width. FIG. 2 is a graph showing influence of a pulse frequency on the number of weld defects.

As shown in FIG. 1 and FIG. 2, the degree of variation in bead width and the number of weld defects decrease in the pulsed TIG welding in which the pulse waveform is used as the current waveform, as compared with TIG welding in

TABLE 3

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Number of Weld Defects (pieces/m) | Remarks |
|---|---|---|---|---|---|---|---|---|---|---|
| 0.3 | 5.0 | — | — | 120 | 0 (DC) | 1.5 | 0.17 | 11 | 2.2 | Comparative Example |
| ↑ | ↑ | 10 | 210 | 120 | 25 | | 0.16 | 11 | — | Comparative Example |
| ↑ | ↑ | ↑ | ↑ | ↑ | 40 | | 0.04 | 3 | — | Inventive Example |
| ↑ | ↑ | ↑ | ↑ | ↑ | 50 | | 0.04 | 3 | 0.4 | Inventive Example |
| ↑ | ↑ | ↑ | ↑ | ↑ | 75 | | 0.03 | 2 | 0.5 | Inventive Example |
| ↑ | ↑ | ↑ | ↑ | ↑ | 100 | | 0.02 | 1 | 0.2 | Inventive Example |
| ↑ | ↑ | ↑ | ↑ | ↑ | 150 | | 0.06 | 4 | 0.2 | Inventive Example |
| ↑ | ↑ | ↑ | ↑ | ↑ | 200 | | 0.07 | 5 | 0.3 | Inventive Example |
| ↑ | ↑ | ↑ | ↑ | ↑ | 300 | | 0.07 | 5 | 0.5 | Inventive Example |
| ↑ | ↑ | ↑ | ↑ | ↑ | 500 | | 0.12 | 8 | 1.2 | Comparative Example |
| ↑ | ↑ | ↑ | ↑ | ↑ | 5000 | | 0.17 | 11 | 1.8 | Comparative Example |

In a case where the number of defects in a sample was 0.5 or lower per 1 m of a welded steel tube, such a sample was determined to be acceptable. In a case where Ar was used as the shielding gas, the number of defects was 1.2 pieces/m or less in a range of result (frequency of 37 Hz when coefficient C=0.8, frequency of 555 Hz when coefficient C=1.4) of the formula (1) with respect to a thickness of 0.3 mm. By using the pulse waveform with a pulse frequency of 40 Hz to 300 Hz, the number of weld defects can be controlled to 0.5 pieces/m or less. Although data of the number of weld defects that occur under a condition of a pulse frequency of 40 Hz has not been obtained yet, probability that the number of weld defects is less than 0.5 can be said as sufficiently high, in view of the relation with the degree of variation in bead width. This can be understood with reference to the descriptions below concerning FIG. 3.

The number of defects was 0.2 pieces/m under a condition of a frequency of 100 Hz which was close to a frequency of which a direct current is used as a welding current. Moreover, it is shown that the effect is most greatly achieved in a case where the pulse frequency is changed to approximately 100 Hz. Further, by setting the pulse frequency to a range from 40 Hz to 300 Hz, the number of weld defects can be controlled to 0.5 pieces/m or less.

Thus, it was confirmed that the degree of variation in bead width and the number of weld defects can be reduced by changing the pulse frequency.

Here, a weld bead width changes depending on a thickness of a steel material, and therefore the following can be found by universally expressing a variation in weld bead width as a ratio of variation in bead width and by analyzing a relation between the ratio of variation in bead width and the number of weld defects. FIG. 3 is a graph showing a relation between a ratio of variation in weld bead width and the number of weld defects.

As shown in FIG. 3, there is a correlation between the ratio of variation in weld bead width and the number of weld defects, and it has been found that it is possible to produce a welded steel tube having good quality in which the number of weld defects is 0.5 pieces/m or less by controlling the degree of variation in bead width within 5%.

For checking the number of weld defects, as above described, much exertion is demanded, that is, it is necessary to carry out processes in which an evaluation target material is cut and is observed with use of an optical microscope, and a depth of a dipped part that has been generated in a weld bead is evaluated. Therefore, in Examples below, each welded steel tube was evaluated by checking the ratio of variation in weld bead width, based on the relation between the ratio of variation in weld bead width and the number of weld defects.

Example 2

Three types of high-purity ferrite-based stainless steel (i.e., the steel materials A through C) which are shown in Table 1, had different thicknesses, and contained approximately 28% by weight of Cr and approximately 3.8% by weight of Mo were shaped into rolls, and then TIG welding was carried out while using Ar as a shielding gas. Thus, welded steel tubes having a diameter of ϕ25.4 mm were produced, and a relation between welding conditions of TIG welding and the variation in weld bead width was analyzed. Specifically, an effect of the production method in accordance with the present invention brought about in a case where a plate thickness of a steel material varied was analyzed.

Results are shown in Tables 4 through 6. For each of the steel materials A through C, a variation in width (i.e., a difference between a largest width and a smallest width) of 5% or lower with respect to an average bead width on an outer surface was considered as acceptable.

In a case where Ar was used as the shielding gas, for example, a variation in bead width exceeded 0.15 mm (which was 5% of the average value (3 mm) of the bead width) when the frequencies (25 Hz and 350 Hz) were out of the result (frequency of 28 Hz when coefficient C=0.8, frequency of 342 Hz when coefficient C=1.4) of the formula (1) with respect to a thickness of 0.6 mm. Meanwhile, under the conditions in which the frequencies were 40 Hz to 300 Hz, the degree of variation in bead width was not more than 0.15 mm (i.e., the ratio of variation of 5% or lower).

$$f=(50/(t^{0.5}))^C \quad (1)$$

where f: pulse frequency (Hz),
t: thickness of steel strip (mm),
C: coefficient (0.8 to 1.4).

The following (i) through (iii) show results of the respective steel materials A through C.

(i) Each of welded steel tubes which were obtained by carrying out TIG welding with use of the steel material A (having a thickness of 1.0 mm) and Ar as a shielding gas under the welding conditions shown in Table 4 had an average bead width of approximately 4.6 mm on an outer surface. Under the conditions in which the pulse frequencies were 40 Hz to 300 Hz, the ratio of variation in bead width was 5% or lower.

TABLE 4

| | | | | | Steel Material A | | | | |
|---|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| 1.0 | 1.7 | — | — | 125 | 0 (DC) | 4.6 | 0.45 | 10 | Comparative Example |
| ↑ | ↑ | 20 | 230 | 125 | 25 | | 0.31 | 7 | Comparative Example |
| ↑ | ↑ | ↑ | ↑ | ↑ | 40 | | 0.20 | 4 | Inventive Example |
| ↑ | ↑ | ↑ | ↑ | ↑ | 60 | | 0.18 | 4 | Inventive Example |
| ↑ | ↑ | ↑ | ↑ | ↑ | 80 | | 0.17 | 4 | Inventive Example |
| ↑ | ↑ | ↑ | ↑ | ↑ | 100 | | 0.17 | 4 | Inventive Example |
| ↑ | ↑ | ↑ | ↑ | ↑ | 120 | | 0.20 | 4 | Inventive Example |
| ↑ | ↑ | ↑ | ↑ | ↑ | 150 | | 0.19 | 4 | Inventive Example |
| ↑ | ↑ | ↑ | ↑ | ↑ | 200 | | 0.21 | 5 | Inventive Example |
| ↑ | ↑ | ↑ | ↑ | ↑ | 300 | | 0.23 | 5 | Inventive Example |
| ↑ | ↑ | ↑ | ↑ | ↑ | 400 | | 0.33 | 7 | Comparative Example |
| ↑ | ↑ | ↑ | ↑ | ↑ | 500 | | 0.36 | 8 | Comparative Example |

(ii) Each of welded steel tubes which were obtained by carrying out TIG welding with use of the steel material B (having a thickness of 0.6 mm) and Ar as a shielding gas under the conditions shown in Table 5 had an average bead width of approximately 3.0 mm on an outer surface. Under the conditions in which the pulse frequencies were 40 Hz to 300 Hz, the ratio of variation in bead width was 5% or lower.

TABLE 5

| | | | | | | Steel Material B | | | |
|---|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| 0.6 | 2.8 | — | — | 120 | 0 (DC) | 3.0 | 0.34 | 11 | Comparative Example |
| ↑ | ↑ | 20 | 220 | 120 | 25 | | 0.20 | 7 | Comparative Example |
| ↑ | ↑ | ↑ | ↑ | ↑ | 40 | | 0.04 | 1 | Inventive Example |
| ↑ | ↑ | ↑ | ↑ | ↑ | 60 | | 0.04 | 1 | Inventive Example |
| ↑ | ↑ | ↑ | ↑ | ↑ | 80 | | 0.04 | 1 | Inventive Example |
| ↑ | ↑ | ↑ | ↑ | ↑ | 100 | | 0.05 | 2 | Inventive Example |
| ↑ | ↑ | ↑ | ↑ | ↑ | 120 | | 0.06 | 2 | Inventive Example |
| ↑ | ↑ | ↑ | ↑ | ↑ | 150 | | 0.09 | 3 | Inventive Example |
| ↑ | ↑ | ↑ | ↑ | ↑ | 200 | | 0.10 | 3 | Inventive Example |
| ↑ | ↑ | ↑ | ↑ | ↑ | 300 | | 0.12 | 4 | Inventive Example |
| ↑ | ↑ | ↑ | ↑ | ↑ | 400 | | 0.24 | 8 | Comparative Example |
| ↑ | ↑ | ↑ | ↑ | ↑ | 500 | | 0.28 | 9 | Comparative Example |

(iii) Each of welded steel tubes which were obtained by carrying out TIG welding with use of the steel material C (having a thickness of 0.3 mm) under the conditions shown in Table 6 had an average bead width of approximately 1.5 mm on an outer surface. Under the conditions in which the pulse frequencies were 40 Hz to 300 Hz, the ratio of variation in bead width was 5% or lower.

TABLE 6

| | | | | | | Steel Material C | | | |
|---|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| 0.3 | 5.0 | — | — | 120 | 0 (DC) | 1.5 | 0.17 | 11 | Comparative Example |
| ↑ | ↑ | 10 | 210 | 120 | 25 | | 0.10 | 7 | Comparative Example |
| ↑ | ↑ | ↑ | ↑ | ↑ | 40 | | 0.04 | 3 | Inventive Example |
| ↑ | ↑ | ↑ | ↑ | ↑ | 60 | | 0.04 | 3 | Inventive Example |
| ↑ | ↑ | ↑ | ↑ | ↑ | 80 | | 0.03 | 2 | Inventive Example |
| ↑ | ↑ | ↑ | ↑ | ↑ | 100 | | 0.02 | 1 | Inventive Example |
| ↑ | ↑ | ↑ | ↑ | ↑ | 120 | | 0.04 | 3 | Inventive Example |
| ↑ | ↑ | ↑ | ↑ | ↑ | 150 | | 0.06 | 4 | Inventive Example |
| ↑ | ↑ | ↑ | ↑ | ↑ | 200 | | 0.07 | 5 | Inventive Example |
| ↑ | ↑ | ↑ | ↑ | ↑ | 300 | | 0.07 | 5 | Inventive Example |
| ↑ | ↑ | ↑ | ↑ | ↑ | 400 | | 0.10 | 7 | Comparative Example |

TABLE 6-continued

| | | | | Steel Material C | | | | | |
|---|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| ↑ | ↑ | ↑ | ↑ | ↑ | 500 | | 0.12 | 8 | Comparative Example |

In all Tables 4 through 6, in the direct current TIG welding in which the welding current was not pulsed, the ratio of variation in bead width was approximately 10%, and a large number of weld defects occurred. In a case where the pulse frequency was out of the condition of the present invention, the ratio of variation in bead width exceeded 5% and, in such a case also, a large number of weld defects occurred and a welded steel tube having good quality could not be obtained.

On the other hand, it was found that a welded steel tube having good quality, i.e., in which the number of weld defects was controlled to 0.5 pieces/m or less could be produced by TIG welding with the pulse frequency falling within the range from 40 Hz to 300 Hz, regardless of the plate thickness of the steel material.

Example 3

The stainless steel strips (i.e., the steel materials D through G shown in Table 2) which had the Cr content of approximately 14% by weight to 30% by weight were shaped into rolls, and then TIG welding was carried out while using Ar as a shielding gas. Thus, TIG welded steel tubes having a diameter of φ25.4 mm were produced. Further, a relation between the welding conditions of TIG welding and the variation in weld bead width was analyzed.

The followings show results of the steel materials D through G.

TIG welding was carried out with use of the steel materials D having thicknesses of 0.3 mm, 0.6 mm, and 1.0 mm and Ar as a shielding gas under the welding conditions shown in Table 7. Obtained welded steel tubes had average bead widths of 1.6 mm, 3.2 mm, and 4.8 mm on outer surfaces, with respect to the respective thicknesses of 0.3 mm, 0.6 mm, and 1.0 mm. In all the cases, under the conditions in which the pulse frequencies were 40 Hz to 300 Hz, the ratio of variation in bead width was 5% or lower.

TABLE 7

| | | | | Steel Material D | | | | | |
|---|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| 0.3 | 5.0 | — | — | 118 | 0 (DC) | 1.6 | 0.20 | 13 | Comparative Example |
| ↑ | ↑ | 10 | 205 | 118 | 25 | | 0.15 | 9 | Comparative Example |
| ↑ | ↑ | ↑ | ↑ | ↑ | 40 | | 0.08 | 5 | Inventive Example |
| ↑ | ↑ | ↑ | ↑ | ↑ | 60 | | 0.08 | 4 | Inventive Example |
| ↑ | ↑ | ↑ | ↑ | ↑ | 80 | | 0.03 | 2 | Inventive Example |
| ↑ | ↑ | ↑ | ↑ | ↑ | 100 | | 0.03 | 2 | Inventive Example |
| ↑ | ↑ | ↑ | ↑ | ↑ | 120 | | 0.04 | 3 | Inventive Example |
| ↑ | ↑ | ↑ | ↑ | ↑ | 150 | | 0.06 | 4 | Inventive Example |
| ↑ | ↑ | ↑ | ↑ | ↑ | 200 | | 0.06 | 4 | Inventive Example |
| ↑ | ↑ | ↑ | ↑ | ↑ | 300 | | 0.08 | 5 | Inventive Example |
| ↑ | ↑ | ↑ | ↑ | ↑ | 400 | | 0.12 | 8 | Comparative Example |
| ↑ | ↑ | ↑ | ↑ | ↑ | 500 | | 0.19 | 12 | Comparative Example |
| 0.6 | 2.8 | — | — | 120 | 0 (DC) | 3.2 | 0.35 | 11 | Comparative Example |
| ↑ | ↑ | 20 | 220 | 120 | 25 | | 0.24 | 5 | Comparative Example |
| ↑ | ↑ | ↑ | ↑ | ↑ | 40 | | 0.12 | 4 | Inventive Example |
| ↑ | ↑ | ↑ | ↑ | ↑ | 60 | | 0.08 | 3 | Inventive Example |
| ↑ | ↑ | ↑ | ↑ | ↑ | 80 | | 0.08 | 2 | Inventive Example |

TABLE 7-continued

Steel Material D

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| ↑ | ↑ | ↑ | ↑ | ↑ | 100 | | 0.06 | 2 | Inventive Example |
| ↑ | ↑ | ↑ | ↑ | ↑ | 120 | | 0.07 | 2 | Inventive Example |
| ↑ | ↑ | ↑ | ↑ | ↑ | 150 | | 0.1 | 3 | Inventive Example |
| ↑ | ↑ | ↑ | ↑ | ↑ | 200 | | 0.13 | 4 | Inventive Example |
| ↑ | ↑ | ↑ | ↑ | ↑ | 300 | | 0.15 | 5 | Inventive Example |
| ↑ | ↑ | ↑ | ↑ | ↑ | 400 | | 0.21 | 7 | Comparative Example |
| ↑ | ↑ | ↑ | ↑ | ↑ | 500 | | 0.25 | 8 | Comparative Example |
| 1.0 | 1.7 | — | — | 125 | 0 (DC) | 4.8 | 0.50 | 10 | Comparative Example |
| ↑ | ↑ | 20 | 230 | 125 | 25 | | 0.33 | 7 | Comparative Example |
| ↑ | ↑ | ↑ | ↑ | ↑ | 40 | | 0.22 | 5 | Inventive Example |
| ↑ | ↑ | ↑ | ↑ | ↑ | 60 | | 0.15 | 3 | Inventive Example |
| ↑ | ↑ | ↑ | ↑ | ↑ | 80 | | 0.11 | 2 | Inventive Example |
| ↑ | ↑ | ↑ | ↑ | ↑ | 100 | | 0.10 | 2 | Inventive Example |
| ↑ | ↑ | ↑ | ↑ | ↑ | 120 | | 0.15 | 3 | Inventive Example |
| ↑ | ↑ | ↑ | ↑ | ↑ | 150 | | 0.17 | 4 | Inventive Example |
| ↑ | ↑ | ↑ | ↑ | ↑ | 200 | | 0.20 | 4 | Inventive Example |
| ↑ | ↑ | ↑ | ↑ | ↑ | 300 | | 0.22 | 5 | Inventive Example |
| ↑ | ↑ | ↑ | ↑ | ↑ | 400 | | 0.28 | 6 | Comparative Example |
| ↑ | ↑ | ↑ | ↑ | ↑ | 500 | | 0.32 | 7 | Comparative Example |

TIG welding was carried out with use of the steel materials E and F having thicknesses of 0.6 mm and 1.0 mm and Ar as a shielding gas under the welding conditions shown in Table 8 and Table 9. In all the cases, under the conditions in which the pulse frequencies were 40 Hz to 300 Hz, the ratio of variation in bead width was 5% or lower.

TABLE 8

Steel Material E

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| 0.8 | 2.8 | — | — | 120 | 0 (DC) | 3.0 | 0.33 | 11 | Comparative Example |
| ↑ | ↑ | 20 | 220 | 120 | 25 | | 0.25 | 8 | Comparative Example |
| ↑ | ↑ | ↑ | ↑ | ↑ | 40 | | 0.15 | 5 | Inventive Example |
| ↑ | ↑ | ↑ | ↑ | ↑ | 60 | | 0.12 | 4 | Inventive Example |
| ↑ | ↑ | ↑ | ↑ | ↑ | 80 | | 0.06 | 2 | Inventive Example |
| ↑ | ↑ | ↑ | ↑ | ↑ | 100 | | 0.06 | 2 | Inventive Example |
| ↑ | ↑ | ↑ | ↑ | ↑ | 120 | | 0.07 | 2 | Inventive Example |
| ↑ | ↑ | ↑ | ↑ | ↑ | 150 | | 0.1 | 3 | Inventive Example |
| ↑ | ↑ | ↑ | ↑ | ↑ | 200 | | 0.13 | 4 | Inventive Example |

TABLE 8-continued

Steel Material E

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| ↑ | ↑ | ↑ | ↑ | ↑ | 300 | | 0.15 | 5 | Inventive Example |
| ↑ | ↑ | ↑ | ↑ | ↑ | 400 | | 0.22 | 7 | Comparative Example |
| ↑ | ↑ | ↑ | ↑ | ↑ | 500 | | 0.25 | 8 | Comparative Example |
| 1.0 | 1.7 | — | — | 125 | 0 (DC) | 4.7 | 0.52 | 11 | Comparative Example |
| ↑ | ↑ | 20 | 230 | 125 | 25 | | 0.32 | 7 | Comparative Example |
| ↑ | ↑ | ↑ | ↑ | ↑ | 40 | | 0.21 | 4 | Inventive Example |
| ↑ | ↑ | ↑ | ↑ | ↑ | 60 | | 0.20 | 4 | Inventive Example |
| ↑ | ↑ | ↑ | ↑ | ↑ | 80 | | 0.12 | 3 | Inventive Example |
| ↑ | ↑ | ↑ | ↑ | ↑ | 100 | | 0.11 | 2 | Inventive Example |
| ↑ | ↑ | ↑ | ↑ | ↑ | 120 | | 0.13 | 3 | Inventive Example |
| ↑ | ↑ | ↑ | ↑ | ↑ | 150 | | 0.16 | 3 | Inventive Example |
| ↑ | ↑ | ↑ | ↑ | ↑ | 200 | | 0.18 | 4 | Inventive Example |
| ↑ | ↑ | ↑ | ↑ | ↑ | 300 | | 0.22 | 5 | Inventive Example |
| ↑ | ↑ | ↑ | ↑ | ↑ | 400 | | 0.3 | 6 | Comparative Example |
| ↑ | ↑ | ↑ | ↑ | ↑ | 500 | | 0.35 | 7 | Comparative Example |

TABLE 9

Steel Material F

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| 0.6 | 2.8 | — | — | 118 | 0 (DC) | 3.0 | 0.40 | 13 | Comparative Example |
| ↑ | ↑ | 20 | 218 | 118 | 25 | | 0.30 | 10 | Comparative Example |
| ↑ | ↑ | ↑ | ↑ | ↑ | 40 | | 0.15 | 5 | Inventive Example |
| ↑ | ↑ | ↑ | ↑ | ↑ | 60 | | 0.10 | 3 | Inventive Example |
| ↑ | ↑ | ↑ | ↑ | ↑ | 80 | | 0.06 | 2 | Inventive Example |
| ↑ | ↑ | ↑ | ↑ | ↑ | 100 | | 0.06 | 2 | Inventive Example |
| ↑ | ↑ | ↑ | ↑ | ↑ | 120 | | 0.08 | 3 | Inventive Example |
| ↑ | ↑ | ↑ | ↑ | ↑ | 150 | | 0.12 | 4 | Inventive Example |
| ↑ | ↑ | ↑ | ↑ | ↑ | 200 | | 0.14 | 5 | Inventive Example |
| ↑ | ↑ | ↑ | ↑ | ↑ | 300 | | 0.16 | 5 | Inventive Example |
| ↑ | ↑ | ↑ | ↑ | ↑ | 400 | | 0.25 | 8 | Comparative Example |
| ↑ | ↑ | ↑ | ↑ | ↑ | 500 | | 0.35 | 12 | Comparative Example |
| 1.0 | 1.7 | — | — | 123 | 0 (DC) | 4.5 | 0.46 | 10 | Comparative Example |
| ↑ | ↑ | 20 | 226 | 123 | 25 | | 0.33 | 7 | Comparative Example |
| ↑ | ↑ | ↑ | ↑ | ↑ | 40 | | 0.22 | 5 | Inventive Example |

TABLE 9-continued

Steel Material F

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| ↑ | ↑ | ↑ | ↑ | ↑ | 60 | | 0.18 | 4 | Inventive Example |
| ↑ | ↑ | ↑ | ↑ | ↑ | 80 | | 0.11 | 2 | Inventive Example |
| ↑ | ↑ | ↑ | ↑ | ↑ | 100 | | 0.11 | 2 | Inventive Example |
| ↑ | ↑ | ↑ | ↑ | ↑ | 120 | | 0.15 | 3 | Inventive Example |
| ↑ | ↑ | ↑ | ↑ | ↑ | 150 | | 0.15 | 3 | Inventive Example |
| ↑ | ↑ | ↑ | ↑ | ↑ | 200 | | 0.17 | 4 | Inventive Example |
| ↑ | ↑ | ↑ | ↑ | ↑ | 300 | | 0.20 | 4 | Inventive Example |
| ↑ | ↑ | ↑ | ↑ | ↑ | 400 | | 0.36 | 8 | Comparative Example |
| ↑ | ↑ | ↑ | ↑ | ↑ | 500 | | 0.41 | 9 | Comparative Example |

TIG welding was carried out with use of the steel materials G having thicknesses of 0.3 mm and 0.6 mm and Ar as a shielding gas under the welding conditions shown in Table 10. In all the cases, under the conditions in which the pulse frequencies were 40 Hz to 300 Hz, the ratio of variation in bead width was 5% or lower.

TABLE 10

Steel Material G

| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
|---|---|---|---|---|---|---|---|---|---|
| 0.3 | 5.0 | — | — | 120 | 0 (DC) | 1.6 | 0.23 | 14 | Comparative Example |
| ↑ | ↑ | 10 | 210 | 120 | 25 | | 0.20 | 13 | Comparative Example |
| ↑ | ↑ | ↑ | ↑ | ↑ | 40 | | 0.08 | 5 | Inventive Example |
| ↑ | ↑ | ↑ | ↑ | ↑ | 60 | | 0.08 | 4 | Inventive Example |
| ↑ | ↑ | ↑ | ↑ | ↑ | 80 | | 0.04 | 3 | Inventive Example |
| ↑ | ↑ | ↑ | ↑ | ↑ | 100 | | 0.04 | 3 | Inventive Example |
| ↑ | ↑ | ↑ | ↑ | ↑ | 120 | | 0.06 | 4 | Inventive Example |
| ↑ | ↑ | ↑ | ↑ | ↑ | 150 | | 0.07 | 4 | Inventive Example |
| ↑ | ↑ | ↑ | ↑ | ↑ | 200 | | 0.08 | 5 | Inventive Example |
| ↑ | ↑ | ↑ | ↑ | ↑ | 300 | | 0.08 | 5 | Inventive Example |
| ↑ | ↑ | ↑ | ↑ | ↑ | 400 | | 0.14 | 9 | Comparative Example |
| ↑ | ↑ | ↑ | ↑ | ↑ | 500 | | 0.15 | 9 | Comparative Example |
| 0.6 | 2.8 | — | — | 120 | 0 (DC) | 3.1 | 0.36 | 12 | Comparative Example |
| ↑ | ↑ | 20 | 220 | 120 | 25 | | 0.21 | 7 | Comparative Example |
| ↑ | ↑ | ↑ | ↑ | ↑ | 40 | | 0.14 | 5 | Inventive Example |
| ↑ | ↑ | ↑ | ↑ | ↑ | 60 | | 0.13 | 4 | Inventive Example |
| ↑ | ↑ | ↑ | ↑ | ↑ | 80 | | 0.08 | 3 | Inventive Example |
| ↑ | ↑ | ↑ | ↑ | ↑ | 100 | | 0.10 | 3 | Inventive Example |
| ↑ | ↑ | ↑ | ↑ | ↑ | 120 | | 0.12 | 4 | Inventive Example |

TABLE 10-continued

| Steel Material G | | | | | | | | |
|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| ↑ | ↑ | ↑ | ↑ | ↑ | 150 | | 0.12 | 4 | Inventive Example |
| ↑ | ↑ | ↑ | ↑ | ↑ | 200 | | 0.14 | 5 | Inventive Example |
| ↑ | ↑ | ↑ | ↑ | ↑ | 300 | | 0.15 | 5 | Inventive Example |
| ↑ | ↑ | ↑ | ↑ | ↑ | 400 | | 0.25 | 8 | Comparative Example |
| ↑ | ↑ | ↑ | ↑ | ↑ | 500 | | 0.27 | 9 | Comparative Example |

In all Tables 7 through 10, in the direct current TIG welding in which the welding current was not pulsed, the ratio of variation in bead width was approximately 10%, and a large number of weld defects occurred. In a case where the pulse frequency was out of the condition of the present invention, the ratio of variation in bead width exceeded 5% and, in such a case also, a large number of weld defects occurred and a welded steel tube having good quality could not be obtained.

On the other hand, it was found that a welded steel tube having good quality, i.e., in which the number of weld defects was controlled to 0.5 pieces/m or less could be produced from each of the steel strips having the Cr content of approximately 14% by weight to 30% by weight by carrying out TIG welding with the pulse frequency falling within the range from 40 Hz to 300 Hz.

Comparative Example

Next, as Comparative Example, the stainless steel strips (i.e., the steel material H shown in Table 2) which had the Cr content of less than 11% by weight (i.e., 10.72% by weight) were shaped into rolls, and then TIG welding was carried out while using Ar as a shielding gas. Thus, TIG welded steel tubes having a diameter of φ25.4 mm were produced. Further, a relation between the welding conditions of TIG welding and the variation in weld bead width was analyzed. Results of the measurement are shown in Table 11.

TABLE 11

| Steel Material H | | | | | | | | |
|---|---|---|---|---|---|---|---|---|
| Plate Thickness t (mm) | Welding Speed (m/min) | Base Current (A) | Peak Current (A) | Average Current (A) | Pulse Frequency (Hz) | Average Bead Width (mm) | Degree of Variation in Bead Width (mm) | Ratio of Variation in Bead Width (%) | Remarks |
| 0.3 | 5.0 | — | — | 120 | 0 (DC) | 1.6 | 0.30 | 19 | Comparative Example |
| ↑ | ↑ | 10 | 210 | 120 | 25 | | 0.18 | 11 | |
| ↑ | ↑ | ↑ | ↑ | ↑ | 40 | | 0.13 | 8 | |
| ↑ | ↑ | ↑ | ↑ | ↑ | 60 | | 0.12 | 8 | |
| ↑ | ↑ | ↑ | ↑ | ↑ | 80 | | 0.10 | 6 | |
| ↑ | ↑ | ↑ | ↑ | ↑ | 100 | | 0.10 | 6 | |
| ↑ | ↑ | ↑ | ↑ | ↑ | 120 | | 0.11 | 7 | |
| ↑ | ↑ | ↑ | ↑ | ↑ | 150 | | 0.13 | 8 | |
| ↑ | ↑ | ↑ | ↑ | ↑ | 200 | | 0.15 | 9 | |
| ↑ | ↑ | ↑ | ↑ | ↑ | 300 | | 0.18 | 11 | |
| ↑ | ↑ | ↑ | ↑ | ↑ | 400 | | 0.20 | 13 | |
| ↑ | ↑ | ↑ | ↑ | ↑ | 500 | | 0.21 | 13 | |
| 0.6 | 2.8 | — | — | 118 | 0 (DC) | 3.0 | 0.38 | 13 | |
| ↑ | ↑ | 20 | 216 | 118 | 25 | | 0.25 | 8 | |
| ↑ | ↑ | ↑ | ↑ | ↑ | 40 | | 0.21 | 7 | |
| ↑ | ↑ | ↑ | ↑ | ↑ | 60 | | 0.20 | 7 | |
| ↑ | ↑ | ↑ | ↑ | ↑ | 80 | | 0.18 | 6 | |
| ↑ | ↑ | ↑ | ↑ | ↑ | 100 | | 0.18 | 6 | |
| ↑ | ↑ | ↑ | ↑ | ↑ | 120 | | 0.20 | 7 | |
| ↑ | ↑ | ↑ | ↑ | ↑ | 150 | | 0.20 | 7 | |
| ↑ | ↑ | ↑ | ↑ | ↑ | 200 | | 0.22 | 7 | |
| ↑ | ↑ | ↑ | ↑ | ↑ | 300 | | 0.24 | 8 | |
| ↑ | ↑ | ↑ | ↑ | ↑ | 400 | | 0.26 | 9 | |
| ↑ | ↑ | ↑ | ↑ | ↑ | 500 | | 0.30 | 10 | |

As shown in this Comparative Example, in the case where the Cr content was less than 11% by weight, the degree of variation in bead width could not be controlled within 5%. This may be because the melting point was low and the weld bead width varied when the molten pool heaved by being widely stirred with the applied pulse. Moreover, although not shown here, the degree of variation in bead width could not be controlled within 5% also in a case where the Cr content was 35% by weight or more. This may be because the melting point was high and the molten pool varied even by slight vibration or the like in welding, and the bead was solidified in that state.

What is claimed:

1. A method for producing a TIG-welded stainless steel tube that excels in welding quality, said method comprising the steps of:
    bending a stainless steel strip in a width direction so as to butt both edges against each other; and
    TIG-welding the both edges thus butted,
    the stainless steel strip being a ferrite-based stainless steel strip,
    an inert gas to which $H_2$ has not been added being used as a shielding gas,
    a pulse waveform of a pulse frequency of 40 Hz to 300 Hz being used as a current waveform of a welding power source,
    wherein a weld bead that is formed on a surface of the welded stainless steel tube has a ratio of variation of 5% or lower, the ratio of variation being represented by a formula (1) below:

$$\text{(Ratio of variation)} = (|X_B - X_C|/X_C) \quad (1)$$

where $X_B$ is a width that is of the weld bead and is in a direction perpendicular to a welding direction, and $X_C$ is a standard value of the width,
    wherein a composition of the stainless steel strip contains 0.01% by weight to 0.6% by weight of Ni.

2. The method as set forth in claim 1, wherein a composition of the stainless steel strip contains 11% by weight to 35% by weight of Cr.

3. The method as set forth in claim 1, wherein the number of weld defects in a weld bead that is formed on a surface of the welded stainless steel tube is 0.5 or less per 1 m of the welded stainless steel tube.

4. A TIG-welded stainless steel tube comprising:
    a TIG-welded part that is formed by bending a stainless steel strip in a width direction and TIG-welding both edges of the stainless steel strip,
    a composition of the stainless steel strip containing 11% by weight to 35% by weight of Cr and 0.01% by weight to 0.6% by weight of Ni,
    the stainless steel strip being a ferrite-based stainless steel strip, and
    the number of weld defects in a weld bead that is formed in the TIG-welded part is 0.5 or less per 1 m of the TIG-welded part,
    wherein the weld bead has a ratio of variation of 5% or lower, the ratio of variation being represented by a formula (1) below:

$$\text{(Ratio of variation)} = (|X_B - X_C|/X_C) \quad (1)$$

where $X_B$ is a width that is of the weld bead and is in a direction perpendicular to a welding direction, and $X_C$ is a standard value of the width.

5. A TIG-welded stainless steel member comprising a TIG-welded stainless steel tube recited in claim 4.

6. The method as set forth in claim 2, wherein the number of weld defects in a weld bead that is formed on a surface of the welded stainless steel tube is 0.5 or less per 1 m of the welded stainless steel tube.

7. A TIG-welded stainless steel member comprising a TIG-welded stainless steel tube recited in claim 4.

8. The method as set forth in claim 1, wherein the composition of the stainless steel strip contains:
    0.17% by weight to 0.44% by weight of Nb, and
    0.12% by weight to 0.35% by weight of Mo.

9. The TIG-welded stainless steel tube as set forth in claim 4, wherein the composition of the stainless steel strip contains:
    0.17% by weight to 0.44% by weight of Nb; and
    0.12% by weight to 0.35% by weight of Mo.

* * * * *